US007689695B2

(12) United States Patent
Astley et al.

(10) Patent No.: US 7,689,695 B2
(45) Date of Patent: Mar. 30, 2010

(54) SYSTEM AND METHOD FOR DISTRIBUTED UTILITY OPTIMIZATION IN A MESSAGING INFRASTRUCTURE

(75) Inventors: Mark C. Astley, Wayne, NJ (US); Sumeer Kumar Bhola, Hastings on Hudson, NY (US); Cristian Lumezanu, Lanham, MD (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 11/770,160

(22) Filed: Jun. 28, 2007

(65) Prior Publication Data

US 2008/0016217 A1   Jan. 17, 2008

Related U.S. Application Data

(60) Provisional application No. 60/817,163, filed on Jun. 28, 2006.

(51) Int. Cl.
*G06F 15/173* (2006.01)
(52) U.S. Cl. .................. 709/226; 709/217; 709/238
(58) Field of Classification Search ............... 709/226
See application file for complete search history.

(56) References Cited

U.S. PATENT DOCUMENTS

| 5,854,754 | A  | * | 12/1998 | Cabrera et al. ............. 703/2 |
| 5,928,331 | A  | * | 7/1999  | Bushmitch ................ 709/231 |
| 6,275,470 | B1 | * | 8/2001  | Ricciulli .................. 370/238 |
| 6,735,663 | B2 | * | 5/2004  | Watts et al. ............... 710/313 |
| 2002/0049841 | A1 | * | 4/2002 | Johnson et al. ............ 709/225 |
| 2003/0236854 | A1 | * | 12/2003 | Rom et al. ............... 709/217 |
| 2005/0060429 | A1 | * | 3/2005 | Massoulie et al. ......... 709/243 |
| 2006/0133346 | A1 | * | 6/2006 | Chheda et al. ............ 370/352 |
| 2007/0201371 | A1 | * | 8/2007 | Chou et al. ............... 370/237 |

OTHER PUBLICATIONS

Lee et al. "Non-Convex Optimization and Rate Control for Multi-Class Services in the Internet." IEEE/ACM Transactions on Networking, vol. 13, No. 4: Aug. 2005. pp. 827-840.*
Subramanian et al. "OverQos: Offering Internet QoS Using Overlays." ACM SIGCOMM Computer Communications Review, vol. 33, No. 1: Jan. 2003. pp. 11-16.*

(Continued)

*Primary Examiner*—Shawki S Ismail
*Assistant Examiner*—Christopher Biagini
(74) *Attorney, Agent, or Firm*—Kenneth R. Corsello; Anne Vachon Dougherty

(57) ABSTRACT

A system and method which integrates a greedy allocation for consumer admission control with a Lagrangian allocation to compute flow rates and which links the results of the two approaches to allow a tradeoff between consumer admission control and flow rates. The Lagrangian Rates, Greedy Populations (hereinafter, "LRGP") solution is a scalable and efficient distributed solution for maximizing the total utility in an event-driven distributed infrastructure. The greedy population, consumer portion generates prices used in the LaGrangian rate flow approach. The method is iterative including a regular exchange of information for ongoing optimization, dynamically adjusting producer rates in response to changes to consumer service and dynamically adjusting the service to consumer populations in response to changes in the producer rates.

4 Claims, 3 Drawing Sheets

OTHER PUBLICATIONS

Gibbens et al. "Measurement-based connection admission control." In 15th International Teletraffic Congress Proceedings, Jun. 1997. pp. 1-10.*

Bhola et al. "Utility-aware Resource Allocation in an Event Processing System." Proceedings of the 3rd IEEE International Conference on Autonomic Computing, Dublin, Ireland, Jun. 2006.*

Bhatnagar et al. "Distributed Admission Control to Support Guaranteed Services in Core-Stateless Networks." IEEE Infocom 2003. pp. 1-11.*

Verma et al. "On Admission Control for Profit Maximization of Networked Service Providers." Proceedings of the 12th international conference on World Wide Web, 2003. pp. 128-137.*

* cited by examiner

SYSTEM AND METHOD FOR DISTRIBUTED UTILITY OPTIMIZATION IN A MESSAGING INFRASTRUCTURE

CROSS-REFERENCE TO RELATED APPLICATIONS

This application claims priority from U.S. Provisional Application 60/817,163 filed in accordance with 35 USC 111(b) on Jun. 28, 2006.

FIELD OF THE INVENTION

The invention relates generally to optimization of data delivery in a computing network and more particularly to system management wherein nodes in a computing environment collaboratively optimize aggregate system performance using flow control and admission control.

BACKGROUND OF THE INVENTION

Event-driven distributed infrastructures are becoming increasingly important and span middleware technologies such as content-based publish/subscribe, stream processing overlays, and Enterprise Service Bus (ESB) architectures. Data messages are automatically generated at producer sites in response to trigger events and are delivered to consumers. Examples of trigger events include breaking news which leads to increased consumer demand, changes in data values (e.g., stock prices reaching preset thresholds), expiration of periodic time intervals (e.g., hourly updates), or the like.

An example of event-driven messaging is delivery of trade data whereby an application produces messages corresponding to each trade in the stock market for a certain market segment. Typically there are two kinds of consumers interested in this data: (1) consumers at one or more brokerage firms, called gold consumers, which pay for the data, and (2) public consumers connected over the Internet. The gold consumers have a higher priority since, as paying consumers, they bring more benefit to the system. Generally a consumer will attach to a node in the system to receive messages of interest. Before messages are provided to public consumers, the messages are altered within the system to remove fields which are to be made available only to gold consumers. In addition, gold consumers pay for and expect reliable delivery, which places extra overhead (e.g., for exchanges of acknowledgements) on the system. The message flow needs to be delivered with low latency, and therefore, is not very elastic in terms of rate, (i.e., the rate cannot be decreased to tolerate delays).

Another example of event-driven messaging comprises delivery of latest price data whereby an application produces messages representing the latest prices of a stock. Public consumers connected to the system receive price messages which satisfy a consumer-specified filter (e.g., price>$80). That is, for each price message, the system evaluates the filter to determine whether the message should be delivered to the consumer. The message flow is very elastic, since rate can be decreased (and latency increased) by reducing the frequency of updates.

The common theme across the messaging technologies is support for asynchronous, loosely-coupled data delivery, including transformations which may alter messages as they flow from producers to consumers. Examples of message transformation include altering based on content, format changes for integrating legacy applications, augmenting messages with content retrieved from databases, and aggregating multiple messages to produce a more concise stream. Message content may be altered based on the consumer class for which the message is intended. Consumers in a "gold" class may subscribe to a premium service to receive messages having more data than is found in messages intended for general consumption.

The messaging infrastructures, which support message routing, message transformation, and consumer admission, must be able to support applications having heterogeneous sets of requirements. For instance, an ESB seeks to integrate all applications within an enterprise including federations of applications across partner enterprises.

Resources, like CPU and network bandwidth, are consumed by both message flows and message consumers. In the above scenarios, system resources are consumed both on a "per message" basis, independent of the number of consumers, and on a "per message, per consumer" basis. The cost of the latter can vary depending on the complexity of the "per consumer" processing, like content filtering, reliable delivery, etc. Further, the workloads placed on an event-driven distributed infrastructure (referred to as "the system" hereinafter) can be unpredictable and bursty, because communication is typically triggered by real world events.

In the presence of significant workload fluctuations, over-provisioning resources to meet peak load requirements is not desirable since it has significant cost in terms of hardware, space, power and human resources. Rather, it is preferable to dynamically allocate existing resources. Optimization of resource utilization should involve both rate control for controlling message flows and admission control for controlling the numbers of consumers at various service levels, with tradeoffs between adjusting the rate of messages and admitting consumers to the messaging system.

It is therefore an object of the present invention to provide optimal resource allocation in an event-driven infrastructure comprising an overlay of computing nodes.

Another object of the invention is to provide rate control along with admission control, performing tradeoffs between adjusting the flow rate for messages and adjusting the admissions of consumers.

Yet another object is to provide a distributed solution enabling the nodes of the system to collaboratively optimize aggregate system performance in a self-optimization scheme that is applicable to an autonomic event-driven infrastructure.

SUMMARY OF THE INVENTION

The foregoing and other objects of the invention are realized in a system and method which integrates a greedy allocation for consumer admission control with a Lagrangian allocation to compute flow rates and which links the results of the two approaches to allow a tradeoff between consumer admission control and flow rates. The invention provides a Lagrangian Rates, Greedy Populations (hereinafter, "LRGP") solution, which is a scalable and efficient distributed solution for maximizing the total utility in an event-driven distributed infrastructure. The greedy population, consumer portion generates prices used in the LaGrangian rate flow approach. The method is iterative including a regular exchange of information for ongoing optimization, dynamically adjusting producer rates in response to changes to consumer service and dynamically adjusting the service to consumer populations in response to changes in the producer rates.

BRIEF DESCRIPTION OF THE DRAWINGS

The invention will now be described with reference to the appended drawings wherein.

DETAILED DESCRIPTION OF THE INVENTION

The inventive system and method for the Lagrangian Rates, Greedy Populations approach (LRGP) provides a scalable and efficient distributed system to maximize total system utility. The solution involves partitioning the optimization problem into two types of subproblems: a greedy allocation for consumer admission control and a Lagrangian allocation to compute flow rates, and dynamic linking of the subproblems in a manner that allows tradeoffs between consumer admission and flow rates while satisfying related constraints. LRGP enables the nodes of the distributed system to collaboratively optimize aggregate system performance in a self-optimization scheme that is applicable to any autonomic event-driven infrastructure. The system exercises resource control in two ways: (1) controlling the rate allocation to a flow at its source node; and, (2) controlling admission of consumers.

Figure 1:
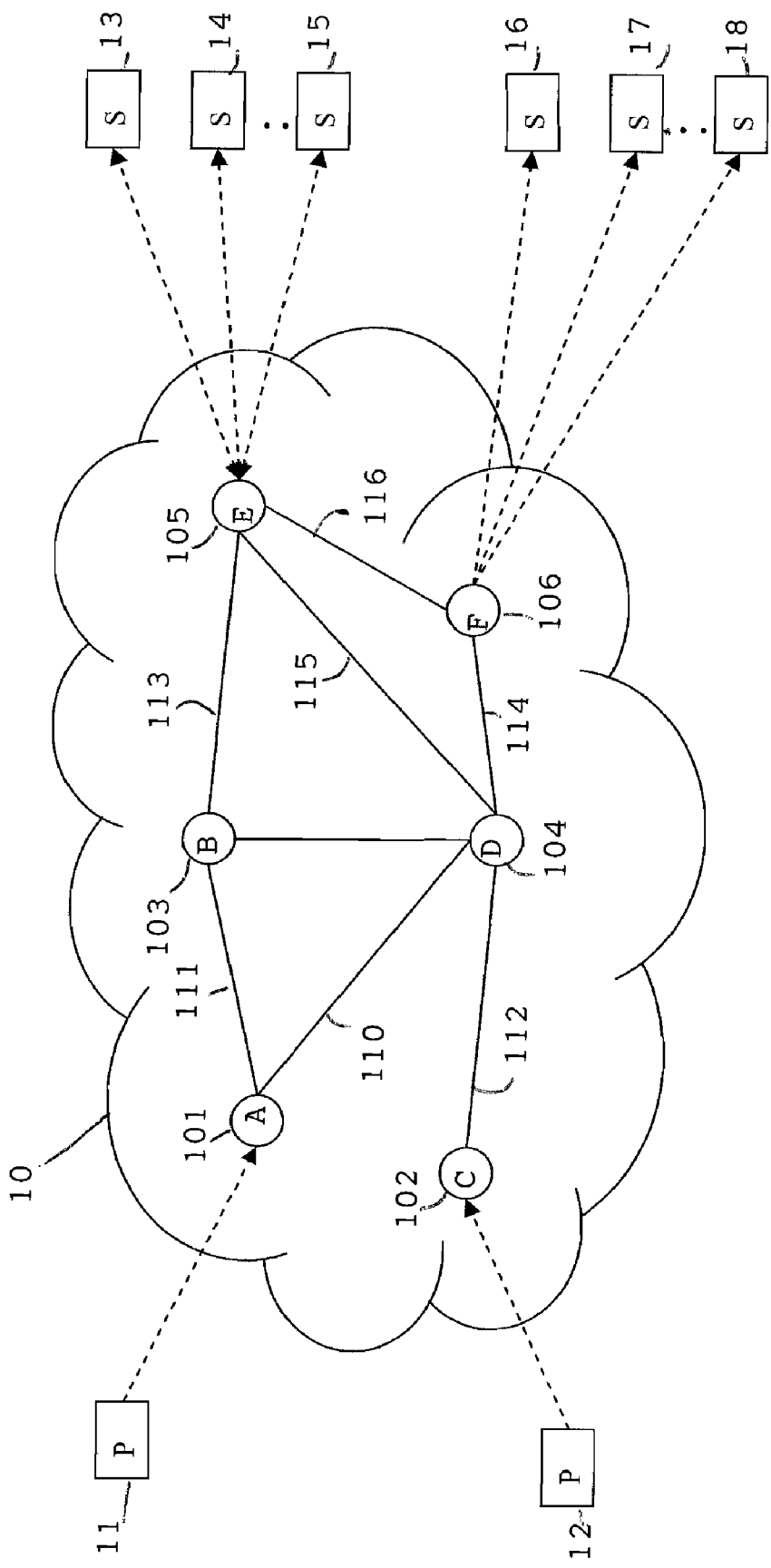
FIG. 1 illustrates a message infrastructure between producers of message data and message consumers.

FIG. 1 illustrates a message infrastructure 10 between producers, representatively illustrated at 11 and 12, and consumers, representatively illustrated at 13-18. The message infrastructure 10 comprises a network of nodes 101-106 interconnected by links 111-116. Links are preferably unidirectional and have a fixed capacity associated with them. A link's capacity can be considered to be equal to the network bandwidth available on the path between the two nodes connected by the link. Each node also has a capacity. Node capacity can be a measure of the available CPU capacity at a machine or set of machines on the node.

Producers and consumers connect directly to nodes of the system. A producer publishes messages on one flow to one system node, but may generate more than one flow through more than one system node. All of the producers in the system that are publishing to a particular flow connect to the same node, called the source node for the flow.

A consumer connects to a node when the consumer is interested in receiving messages from a particular flow. However, the consumer does not receive service until it is admitted by the node. An unadmitted consumer remains connected to the node until it is admitted, and disconnects when it is no longer interested in receiving service. A consumer that has been admitted can be unadmitted, for example when sufficient resources are no longer available in the system to satisfy the consumer's needs. It is to be noted that consumers and producers can be located on the same machine or on different machines connecting to the same node.

Producer messages injected into the system, for example by producer 11 of FIG. 1, are classified into flows. Flow control is optimally implemented at the system node, 101 of FIG. 1, which receives the flow from the producer(s) in order to optimize resource usage. Messages may be transformed at intermediate nodes (e.g., node 103 of FIG. 1) as they are disseminated from producers (11 in FIG. 1) to consumers (13-15 in FIG. 1). That is, while flows consume bandwidth resources at each link (links 111 and 113 in the illustrated example) traversed, the flows also consume CPU resources at nodes that transform messages (node 103) and route messages (nodes 101, 103 and 105).

Consumers of a flow are organized into consumer classes, with one or more consumer classes per flow. Admission control is used to adjust the number of consumers for each class. In the illustrated example, consumer 13 is considered a gold consumer with highest priority, consumer 14 is considered a silver subscriber with medium priority, and consumer 15 is considered as belonging to the bronze class of subscribers having lowest priority. Node 105, which is linked directly to the consumers for message delivery, is the preferable node for implementing admission control by dynamically allocating subscribers in the various classes to optimize resource utilization.

Information about message flows is provided from the flow control node, 101, to the other nodes of the system or to a shared database accessible to all nodes, and information about subscribers and subscriber classes is provided from the admission control node, 105, to the flow control node, 101 or to a shared accessible database. Further, link speed, bandwidth and CPU usage at intermediate nodes are continuously monitored as part of the flow control optimization and made accessible.

While the above description provides a simplified view of the infrastructure, it is to be understood that the message flows are proceeding from multiple producers, through multiple flow control nodes, along multiple links and routing/transforming nodes, to multiple admission control nodes. A flow control node may be receiving flows from more than one producer (e.g., node 101 receives flows from producers 11 and 12 of FIG. 1) and an admission control node, 105, may be receiving flows along multiple links 113, 115, and 116 for different consumers and different consumer classes. The distributed optimizer of the present invention continually adjusts flows and consumer classes at the distributed nodes to optimize overall system utilization and performance. The distributed optimizer is deployed to the multiple nodes of the infrastructure to implement the invention.

The concept of utility functions is useful to further detail the inventive system. Utilities are expressed in terms of message rates and are associated with consumer classes, so that all consumers in a class share the same utility function. More precisely, if the system has $n_j$ consumers of class j currently receiving messages from flow i, then the aggregate utility of these consumers is $n_j \times Uj(r_i)$, where $r_i$ is the rate at which messages corresponding to flow i are being injected into the system, and Uj is the utility function associated with class j. A resource allocation is optimal when it maximizes the overall system utility (i.e., the sum of the aggregate utilities for each class). The distributed optimizer of the present invention determines the rate of messages for each flow, as well as the set of consumers admitted to each consumer class.

The utility of the system depends both on the rate allocation (i.e., rates of all the flows) and on the consumer allocation (i.e., the number of consumers admitted). This makes the objective function (i.e., the sum of the aggregate consumer utilities) not concave (despite Uj being concave) and the resource allocation constraints at the nodes nonconvex, as detailed further below. Prior work on network flow optimization considered only rate allocation, and typically maximized a concave objective function on a convex set. In contrast, the present solution considers both flow rate and admission control. For scalability, it is desirable to provide a distributed solution, where a flow rate is being decided at the flow source, and consumer admission may be decided at each node.

Let F be the set of all flows, C be the set of all consumer classes, B be the set of all nodes, and L be the set of all links. Each consumer class is associated with at most one flow. The set $C_i \subset C$ denotes the set of consumer classes associated with flow i. A function flowMap is defined:$C \to F$ such that flowMap(j)=i if $j \in C_i$.

The number of admitted consumers in a class $j \in C_i$ is denoted by $n_j$ and all of them share the same utility function $U_j(r_i)$, where $r_i$ is the rate of the flow associated with the class j. For simplicity of notation and description herein, and without loss of generality, it is assumed that all consumers in a class connect to the same node. In particular, any class which spans multiple nodes can be partitioned into disjoint classes with identical utility functions. For each flow i, a function is defined whereby attachMap$_i$:$B \to 2^{C_i}$ which gives the set of classes for flow i which attach to node b. That is, if attachMap$_i$(b)=D then each $j \in D$ attaches to node b. Likewise, a function is defined whereby nodeClasses:$B \to 2^C$ such that nodeClasses(b) gives the set of classes (for any flow) which attach to node b.

The objective is to maximize the total utility, (i.e., $$\max \sum_{i \in F} \sum_{j \in C_i} n_j U_j(r_i) \quad (1)$$

There are two simple constraints:

$$0 \leq n_j \leq n^{max}_j, \forall j \quad (2)$$

$$r^{min}_i \leq r_i \leq r^{max}_i, \forall i \quad (3)$$

The first constraint ensures that the number of consumers admitted does not exceed the number of consumers that want to receive service for each class, $n^{max}_j$. The second constraint ensures some bounds on the rate allocation. It is assumed that the flows are elastic within the rate bounds, and that $U_j(r_i)$ is an increasing, strictly concave and continuously differentiable function of the rate $r_i$, $r^{min}_i \leq r_i \leq r^{max}_i$.

In addition to the simple constraints, there are constraints due to finite resources, such as network bandwidth or CPU bandwidth. These constraints are modeled using three cost values:

1. Link cost, $L_{1,i}$ is the amount of resource used in link 1, per unit rate of flow i. If flow i does not traverse link 1, this value is 0. For convenience, a function is defined for linkMap: $L \to 2^F$ such that linkMap(1) gives the set of flows which traverse link 1. $L_i$ is defined as the set of links traversed by flow i.

2. Flow-node cost, $F_{b,i}$ is the amount of resource used in node b, per unit rate of flow i, which does not depend on the number of consumers. If flow i does not reach node b, this value is 0. For convenience, a function nodeMap:$B \to 2^F$ is defined such that nodeMap(b) gives the set of flows which reach node b. $B_i$ is defined as the set of nodes reached by flow i.

3. Consumer-node cost, $G_{b,j}$ is the amount of resource used in node b, per consumer of class j admitted at this node, per unit rate of flow flowMap(j).

The constraint equations for links and nodes respectively are:

$$\sum_{i \in linkMap(l)} L_{1,i} r_i \leq c_1, \forall l \in L \quad (4)$$

$$\sum_{i \in nodeMap(b)} \left( F_{b,i} r_i + \sum_{j \in attachMap(b)} G_{b,j} n_j r_i \right) \leq c_b, \forall b \in B \quad (5)$$

where $c_1, c_b$ are the resource capacities of link 1 and node b, respectively.

The resource constraint equations use the flow rate at the source. Links and nodes within the system may observe a flow rate which is different from that at the source. However, this observed flow rate will be a function of the source rate. Therefore, the coefficients of $r_i$ can be viewed as compensating for this change and also translating the rate into the amount of resource used.

The constraint equations implicitly assume that the value of $n_j$ does not impact the coefficients, $L_{1,i}$ and $F_{b,i}$. In a real system, if $n_j$ is chosen to be 0 (even though $n^{max}_j > 0$), a flow may not be routed to some parts of the system. Instead of explicitly incorporating this dependency, a two-stage approximation is provided to solve the above problem. Assuming that flow i is routed to every node which hosts a class $j \in B_i$ with $n^{max}_j > 0$, the approach prunes the paths where $n_j = 0$ in the previous optimization, by setting certain coefficients $L_{1,i}$, $F_{b,i}$ to 0 and solving the problem.

The LRGP (Lagrangian Rates, Greedy Populations) distributed algorithm optimizes the total system utility. The method utilizes the underlying fact that, at any moment, the utility of a class can be made larger either by increasing the rate of the flow associated with the class, or by increasing the number of consumers of the class. Increasing the number of consumers has a localized effect on the system, such that only the resource of the node where the consumers are attached is affected. As such, the node can make a local decision on how much to increase the consumer number. On the other hand, increasing the rate of the flow can potentially affect the resource constraints of all of the nodes and links on the flow's path. To solve the problem in a distributed setting, the concept of price is utilized. A price is associated with each link and node resource and indicates the extent to which the resource is congested. Each node computes a node price value and sends it to the source nodes of the flows that traverse it. Link price is computed by one of the two nodes which are the endpoints of a link. Link price is also sent to the source nodes of the flows that traverse the link. The source node, in turn, computes new rates for the flows.

A node resource is affected by both the rates of the flows that visit the node and the number of consumers attached to the node. This nonconvex constraint cannot be satisfied purely using a price mechanism, so the consumer allocation at a node explicitly tries to satisfy the constraint. The consumer allocation at the node uses the consumers that were not admitted to set its price, thereby effecting a tradeoff between increasing the rate and increasing the number of consumers.

Figure 2:
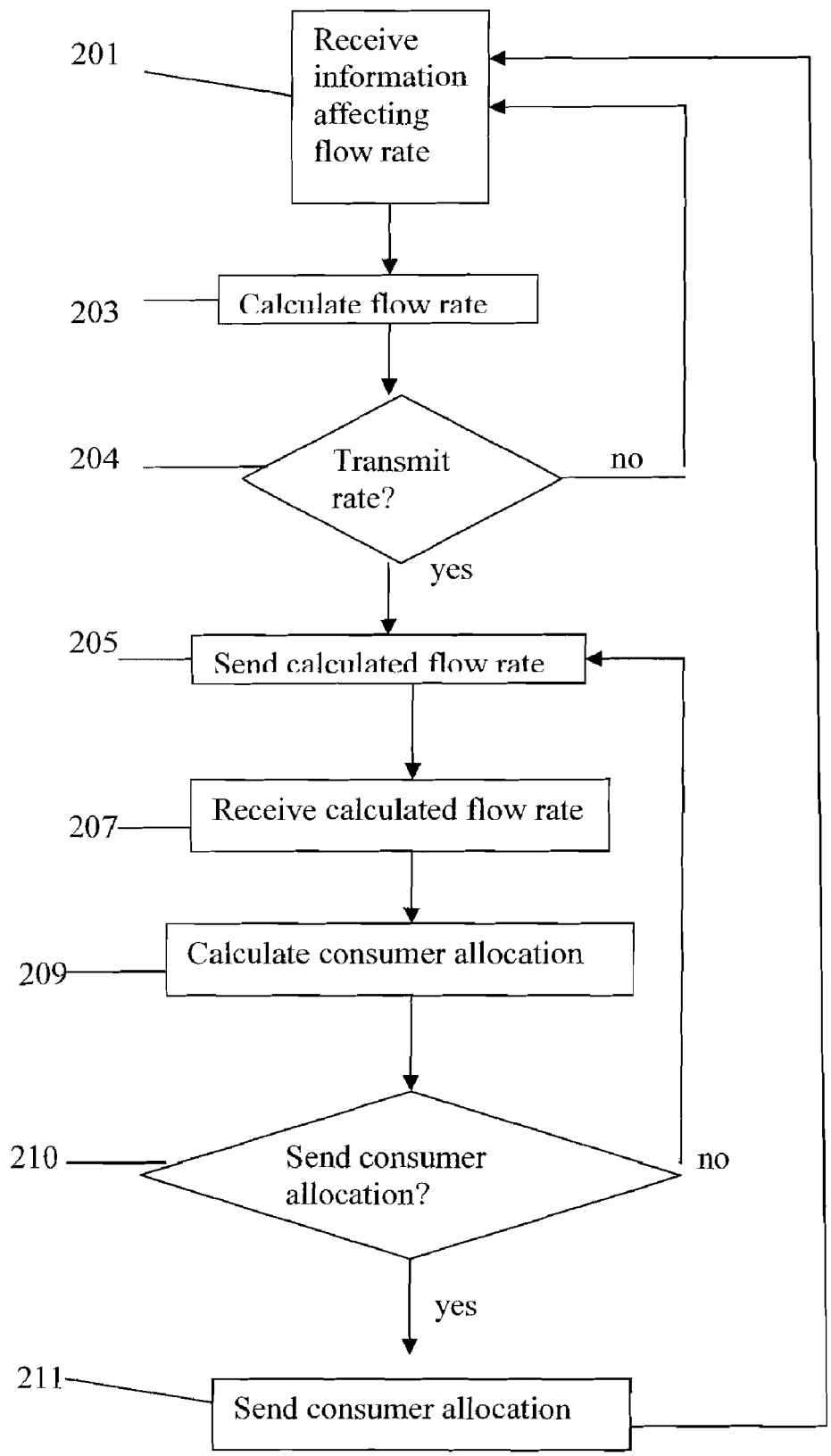
FIG. 2 illustrates a process flow for implementing the present invention.

Rate allocation finds the optimal rate at a certain time, given a constant number of consumers; consumer allocation finds an optimal number of consumers for each class, given constant flow rates and computes new values for link and node prices. LRGP iterates continuously between these two allocations to increase the value of the objective function. As illustrated in FIG. 2, the distributed components receive update messages from nodes and links and iteratively generate updated values for their respective variables (i.e., flow rate or consumer/class settings). At step 201, a node receives information affecting flow control. That information received at step 201 includes not only customer and class information from an admission control node, but also link and node capacity price information from intermediary nodes. Link price is computed by one of the two nodes which are the endpoints of the link and is sent by the computing node to the other nodes in the network. At step 203, the flow control node computes the rate allocation, updating the rate of flow of producer information based on the received information affecting flow control, followed by sending the latest flow information through the system at step 205. An optional determination as to whether the calculated flow rate should be sent may be conducted at step 204 as further detailed below. Each admission control node receives flow information at step 207 and updates the customer admission information at step 209. Other intermediary nodes also adjust their capacity information at 209 upon receipt of the latest flow information. An optional step 210 may be conducted to determine if the updated information affecting flow control should be sent, as further detailed below. At step 211, nodes send information affecting flow control. This cycle of dynamic exchange of information and dynamic controlling of flow rates and admission of consumers in classes yields optimization of resources.

In the foregoing description the method has been detailed as if the optimizer is running all the time and is continually responding to changes in workload and system capacity by adjusting rates and consumer allocation. However, in a real system setting, making very frequent admission control decisions may be disruptive to consumers using the system, so the decisions may not be enacted until their values are sufficiently different from a previous enacted value or may be enacted periodically (e.g., once every few minutes). As such, a modified process flow of FIG. 2 would include a decision-making step or series of steps between the updating and sending steps, specifically step 204 between steps 203 and 205 on the flow control side and step 210 between steps 209 and 211 at the other nodes, to decide whether to send updated information. The decision may be based on a thresholding determination as to whether the change in flow or the change in information affecting flow control is sufficient to warrant reporting to the other nodes or as determination as to whether a pre-set interval has expired.

As detailed above, the main optimization problem is divided into two sub-problems which alternately compute rate and population. In the greedy population allocation portion of the method the flow rates are fixed and populations are computed using a greedy approach at each node such that the maximum utility is obtained without violating the node constraint. In the Lagrangian rate allocation portion of the method, populations are fixed and rates are computed using a Lagrangian approach at the source of each flow, constraining rates with link and node "prices" rather than with constraint functions. The method is further fine-tuned by performing a benefit/cost price determination comprising resetting a node price after consumer allocation to reflect the value of consumers that were not admitted. This price component captures tradeoffs between increasing the number of consumers versus increasing the flow rates.

A single iteration of LRGP consists of a rate allocation step, a consumer allocation step, and link and node price computation. LRGP iterates indefinitely but particular allocations may only be enacted periodically (e.g., every few minutes, or when significant changes occur, as noted above).

The rate and consumer allocation and the price computation are described in more detail below.

The rate allocation algorithm, step 203 of FIG. 2, runs individually at the source node of each flow. It computes a new rate for the flow, based on the feedback sent by the nodes and links visited by the flow. It uses the Lagrangian of the original optimization problem, (Equation 1), with an assumption that the $n_j$ values are constants.

$$L(r_i, p_b, p_1) = \sum_{i \in F} \sum_{j \in C_i} n_j U_j(r_i) - \sum_{l \in L} p_1 \left( \sum_{i \in linkMap(l)} L_{1,i} r_i - c_1 \right) - \sum_{b \in B} p_b \left( \sum_{i \in nodeMap(b)} \left( F_{b,i} r_i + \sum_{j \in attachMap_i(b)} G_{b,j} n_j r_i \right) - c_b \right) \quad (6)$$

where $p_1$ and $p_b$ are the Lagrange multipliers and can be interpreted as the price per unit of resource at link l and node b, respectively. Terms $p_1$ and $p_b$ are referred to as prices hereinafter.

Instead of solving the original optimization problem, the Lagrangian can be used to solve the following alternative problem for each flow i, given specific values for $n_j$, $p_1$ and $p_b$.

$$D(p_1, p_b) = \max_{r_i} \left( \sum_{j \in C_i} n_j U_j(r_i) - r_i (PL_i + PB_i) \right) \quad (7)$$

where $$PL_i = \sum_{l \in L_i} L_{1,i} p_1 \quad (8)$$

$$PB_i = \sum_{b \in B_i} \left( F_{b,i} + \sum_{j \in attachMap_i(b)} G_{b,j} n_j \right) p_b \quad (9)$$

Since the objective function in Equation (7) depends only on $r_i$ and $U_j(r_i)$ is strictly concave for all $j \in C_i$, the objective function is strictly concave and differentiable. The maximum is found by setting its derivative with respect to $r_i$ to 0.

The rate allocation process is performed by executing the following operation at the source node of each flow. At step 201, the node receives the number of allocated consumers $n_j$, $\forall j \in C_i$ and price values $p_b$, $p_1$, $\forall b \in B_i$, $\forall 1 \in L_i$. Next, at step 203, the node computes a new transmission rate $r_i$ by setting the derivative with respect to $r_i$ of the objective function in Equation (7) to 0. In the optional step 204, the node determines if the new transmission rate should be sent, based on whether the amount of change in the calculated rate exceeds a threshold, or based on expiration of a preset time period. At step 205, the node sends $r_i$ to all the nodes and all the links in the path of the flow.

The consumer allocation process consists of allocating consumers for each flow. That is, each consumer-hosting node b runs a consumer allocation algorithm that, given the current rate $r_i$ of each flow through the node (in the current iteration), computes values for $n_j$. The new $n_j$ allocations will be forwarded to the relevant source nodes for the next iteration once new prices have been computed. A greedy approach is used which sorts the consumer classes at the node in decreasing order of benefit-cost ratio. The benefit-cost ratio of a consumer class j is the increase in utility divided by the increase in node resource consumed, when $n_j$ is increased by 1. The equation that computes this ratio for class j is:

$$BC_j = \frac{U_j(r_{flowMap(j)})}{G_{b,j} r_{flowMap(j)}} \quad (10)$$

Note that the right hand side of this equation is constant since the $r_i$ values are constant, and does not depend on $n_j$. The greedy algorithm starts with all $n_j$ equal to 0, and increases the $n_j$ of the consumer class with the highest $BC_j$, until either $n_j = n^{max}_j$, or the node constraint is reached. In the former case, the allocation is continued with the class with the next highest $BC_j$. Note that it is possible that all rates exceed the node constraint before allocation occurs (i.e. $n_j=0, \forall j$). In this case, no allocation occurs and each $n_j$ will remain at 0.

Node price computation is done whereby the benefit-cost ratio for node b at iteration t is defined as:

$$BC(b,t) = \max_j(BC_j(t)), \forall j \in \text{nodeClasses}(b), n_j < n^{max}_j \quad (11)$$

where $BC_j(t)$ are the individual benefit-cost ratios used in the consumer allocation algorithm at node b at iteration t. Intuitively, the benefit-cost ratio for the node represents the maximum increase in utility achievable by increasing the consumer allocation for a class that has not achieved its full allocation if the constraint is relaxed by one unit. $BC(b,t)$ is not used directly as the price for the following reasons:

1. The variation in $BC(b,t)$ between iterations can be very high, which can cause instability. Instead a dampening scheme is used which incrementally approaches this value.

2. There is a boundary case where all the $n_j$ values are 0, j but the value of $BC(b,t)$ is too low to constrain the rates. In this case, there is no tradeoff to be made between rates and consumers at the node, and the price is only used to tradeoff between rates and to meet the node constraint, $c_b$.

Let $used_b(t)$ represent the amount of node resource used at the end of the consumer allocation at time t. The price is adjusted using the following formula:

$$p_b(t+1) = \begin{cases} p_b(t) + \gamma_1(BC(b,t) - p_b(t)), & \text{if } used_b(t) \leq c_b \\ p_b(t) + \gamma_2(used_b(t) - c_b), & \text{if } used_b(t) > c_b \end{cases} \quad (12)$$

where $Y_1$ and $Y_2$ are stepsizes, with $\gamma_1, \gamma_2 \in [0, \infty)$.

The following process is run by each node in the system:

1: Receive the computed rates of the flows that go through b in the current iteration.

2: Compute $n_j$ for each class $j \in \text{nodeClasses}(b)$, using the greedy approach.

3: Compute a new price $p_b$ based on Equation (12).

4: Send the price $p_b$ and the number of allocated consumers for each class $n_j$ to all the source nodes of the flows that reach node b.

A price adjustment algorithm is used to compute the link prices. The algorithm is based on the gradient projection method, wherein the link prices are adjusted in a direction opposite to the gradient of the objective function of the dual problem (Equation (7)). The component of the gradient corresponding to the price $p_1$, $[(\partial D)/(\partial p_1)]$ is the available resource at link 1.

The resulting formula for adjusting the link price is:

$$p_l(t+1) = p_l(t) + \gamma_1\left(\sum_{i \in linkMap(l)} L_{l,i} r_i(t) - c_l\right) \quad (13)$$

where $\gamma_1$ is a stepsize, with $\gamma_1 \in [0, \infty)$.

If the amount of consumed resources exceeds the capacity of the link, then the price associated with the link will increase. Otherwise, the price is reduced, since higher rates can be accommodated. The following steps are run on behalf of each link l in the system, by one of the two nodes connected by the link:

1: Receive the computed rates of the flows that go through l in the current iteration.

2: Compute a new price $p_1$ based on Equation (13).

3: Send the price $p_1$ to all the source nodes of the flows that reach node b.

Figure 3:
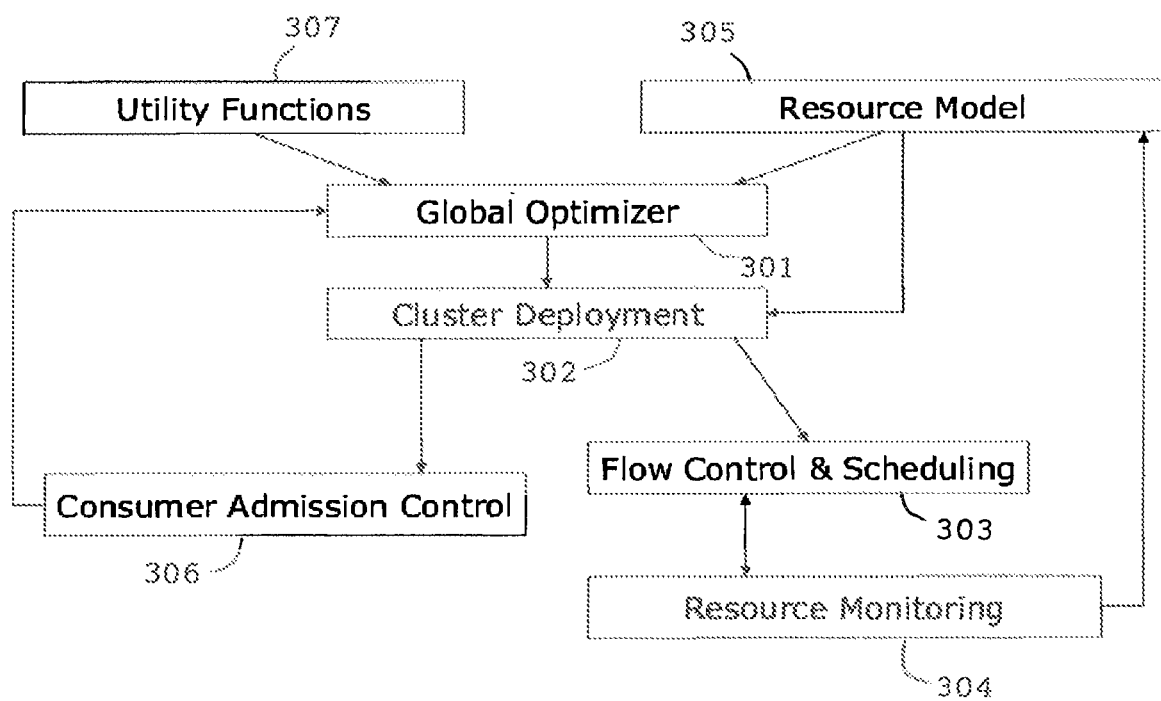
FIG. 3 illustrates a representative architecture of the resource management system adapted to manage a collection of servers grouped into clusters.

LRGP can be centralized by co-locating all the different algorithmic pieces in one node. This centralization saves the communication overhead associated with each iteration at the expense of updates required when changes occur to the constants defining the problem, such as $n^{max}_j$, resource capacities, costs, etc. The centralized model provides resource management for a cluster. FIG. 3 shows the component architecture of the resource management system adapted to manage a collection of servers which are grouped into geographical clusters, with clusters connected in an overlay network. Message producers and consumers connect to the nearest cluster. In the illustrated architecture, there is one logical global optimizer component 301 which incorporates LRGP and which receives inputs from utility functions 307, a consumer admission control component 306, and a resource model 305 connected to receive flow control and monitor input. The global optimizer periodically produces a flow rate allocation and a per-cluster (rather than per-node) consumer allocation. Each cluster deployment component 302 (one per cluster) uses a cluster-specific policy (e.g. load balancing) to deaggregate the allocation across local servers. This allocation is used by the per-cluster admission control component 306 and the flow control component 303.

Flow control is used to prevent system overload in the presence of transient failures, and to utilize spare capacity caused by errors in resource models or workload fluctuations. The logical flow control component 303 interacts with the resource monitoring component 304, which also provides feedback to improve the aggregate resource models 305 and the intra-cluster resource models, not shown, which are used in deaggregation. Note that in this context, each node seen by LRGP is in fact a cluster of servers. The hierarchical approach is used to reduce the size of the problem seen by the global optimizer, and to improve efficiency and fault-tolerance of the resource management system by delegating local decision-making to each cluster.

The above description is only illustrative, intended to enable those skilled in the art to implement the present invention, and not as limitations on the present invention. The various steps in the described methods according to the various embodiments of the present invention may also be performed in a different order, or some steps may be added, deleted, or replaced, without departing from the scope and spirit of the present invention. The various components in the described apparatuses and systems according to the various embodiments of the present invention can be implemented as software, firmware, hardware, or any combination thereof, and these components can be split or combined, provided the functionality can be realized. In a preferred implementation, these apparatuses are a combination of general purpose computer hardware and the corresponding software functional modules. The claimed scope of invention is not defined by the above description, but uniquely defined by the following claims.

What is claimed is:

1. A computer-implemented method to optimize resource utilization in a system of computer hardware nodes connecting producers and consumers for delivering data between users at said nodes at allocatable data flow rates, comprising the steps of:

dynamically adjusting data flow rates in response to consumer service control information; and dynamically adjusting consumer service control information in response to data flow rates, wherein said system comprises a plurality of nodes connected by links, said plurality of nodes comprising at least one source node connected to receive data from at least one producer and at least one consumer control node to which consumers connect to obtain data and at least one intermediate node between said at least one source node and said at least one consumer control node, said method further comprising the steps of:

said at least one source node dynamically adjusts data flow rates by the steps of:

acquiring consumer service control information and price information;

acquiring producer rate information generated by at least one content producer;

adjusting data flow rates based on producer rate information, consumer service control information and price information; and making data flow rates available to nodes in said system; and said at least one consumer control node dynamically adjusts consumer service control information by the steps of:

acquiring data flow rates;

computing a number of consumers for each of a plurality of service classes;

determining a price based on at least node capacity for the number of consumers for each service class for a rate of flow; and making the number of consumers for each of a plurality of service classes and the price available to nodes in said system;

wherein said steps are iteratively repeated by said at least one source node and said at least one consumer service control node to determine optimal flow rate and consumer service control for optimal resource usage; and making said data available to consumers based on the determined optimal flow rate and consumer service control.

2. The method of claim 1 wherein said system further comprises at least one intermediate node connected by links between said at least one source node and said at least one consumer control node, said method further comprising the steps of:

at least one of said nodes performing the steps of:

computing a node price for handling a rate of flow;

computing a link price for a connected link for handling the rate of flow; and making the node price and link price available to nodes in said system;

and wherein said steps are iteratively repeated by said at least one source node, said at least one consumer service control node and said at least one intermediate node to determine optimal flow rate and consumer service control for optimal resource usage.

3. A distributed system for delivery of content between content producers and content consumers across multiple computer hardware nodes connected by links comprising:

at least one source node for receiving producer content, said at least one source node comprising a flow rate calculation component for dynamically calculating a rate of at least one flow of producer content in said system and for making said rate of flow available for use by other nodes in the system; and at least one consumer admission node for receiving said rate of flow from said at least one source node, said at least one consumer admission node comprising at least one admission control component for dynamically controlling consumer access to said producer content, and at least one consumer admission price calculation component for dynamically generating consumer admission node price information for a rate of flow and for providing consumer admission node price information for use by other nodes in the system; and at least one intermediate node between said at least one source node and said at least one consumer control node, said method further comprising the steps of:

said at least one source node dynamically adjusts data flow rates by the steps of:

acquiring consumer service control information and price information;

acquiring producer rate information generated by at least one content producer;

adjusting data flow rates based on producer rate information, consumer service control information and price information; and making data flow rates available to nodes in said system; and said at least one consumer control node dynamically adjusts consumer service control information by the steps of:

acquiring data flow rates;

computing a number of consumers for each of a plurality of service classes;

determining a price based on at least node capacity for the number of consumers for each service class for a rate of flow; and making the number of consumers for each of a plurality of service classes and the price available to nodes in said system;

and wherein said steps are iteratively repeated by said at least one source node and said at least one consumer service control node to determine optimal flow rate and consumer service control for optimal resource usage; and wherein said data is made available to consumers based on the determined optimal flow rate and consumer service control.

4. The system of claim 3 wherein at least one node comprises a link price calculation component computing a node price for handling a rate of flow;

computing a link price for a connected link for handling the rate of flow; and making the node price and link price available to nodes in said system;

and wherein said steps are iteratively repeated by said at least one source node, said at least one consumer service control node and said at least one intermediate node to determine optimal flow rate and consumer service control for optimal resource usage.

* * * * *